United States Patent [19]

Bastioli et al.

[11] Patent Number: 5,258,430
[45] Date of Patent: Nov. 2, 1993

[54] POLYMER COMPOSITIONS FOR THE PRODUCTION OF ARTICLES OF BIODEGRADABLE PLASTICS MATERIAL AND METHODS OF THEIR PREPARATION

[75] Inventors: Catia Bastioli, Novara; Vittorio Bellotti, Fontaneto d'Agogna; Luciano Del Guidice, Milan; Roberto Lombi, Novara, all of Italy

[73] Assignee: Novamont S.p.A., Milan, Italy

[21] Appl. No.: 671,766

[22] PCT Filed: Aug. 1, 1990

[86] PCT No.: PCT/EP90/01253

§ 371 Date: Mar. 27, 1991

§ 102(e) Date: Mar. 27, 1991

[87] PCT Pub. No.: WO91/02024

PCT Pub. Date: Feb. 21, 1991

[30] Foreign Application Priority Data

Aug. 7, 1989 [IT] Italy ................... 67692 A89

[51] Int. Cl.⁵ ............................. C08L 3/02; C08F 8/34
[52] U.S. Cl. ..................................... 524/52; 524/53; 523/128; 525/61; 525/344; 525/345; 525/328.4; 525/385
[58] Field of Search ............... 523/128; 524/52, 53; 525/61, 344, 345, 328.4, 385

[56] References Cited

U.S. PATENT DOCUMENTS

| | | | |
|---|---|---|---|
| 3,652,542 | 3/1972 | Hjermstad | 260/233.3 R |
| 3,949,145 | 4/1976 | Otey et al. | 524/52 |
| 4,008,116 | 2/1977 | Sebel | 524/52 |
| 4,673,438 | 6/1987 | Wittwer | 106/126 |
| 4,863,655 | 9/1989 | Lacourse et al. | 264/53 |
| 4,900,361 | 2/1990 | Sachetto et al. | 106/213 |
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |

FOREIGN PATENT DOCUMENTS

| | | |
|---|---|---|
| 0032802 | 7/1981 | European Pat. Off. . |
| 0282451 | 9/1988 | European Pat. Off. . |
| 0298920 | 1/1989 | European Pat. Off. . |
| 0304401 | 2/1989 | European Pat. Off. . |
| 0326517 | 8/1989 | European Pat. Off. . |
| 0327505 | 8/1989 | European Pat. Off. . |
| 0404723 | 2/1990 | European Pat. Off. . |
| 0388924 | 9/1990 | European Pat. Off. . |
| 0391853 | 10/1990 | European Pat. Off. . |
| 0400532 | 12/1990 | European Pat. Off. . |
| 0404727 | 12/1990 | European Pat. Off. . |
| 0404728 | 12/1990 | European Pat. Off. . |
| 0407350 | 1/1991 | European Pat. Off. . |
| 0408501 | 1/1991 | European Pat. Off. . |
| 0408502 | 1/1991 | European Pat. Off. . |
| 0408503 | 1/1991 | European Pat. Off. . |
| 0409781 | 1/1991 | European Pat. Off. . |
| 0409782 | 1/1991 | European Pat. Off. . |
| 0409783 | 1/1991 | European Pat. Off. . |
| 0409788 | 1/1991 | European Pat. Off. . |
| 0409789 | 1/1991 | European Pat. Off. . |
| WO90/10671 | 9/1990 | PCT Int'l Appl. . |
| WO91/02023 | 2/1991 | PCT Int'l Appl. . |
| WO91/02024 | 2/1991 | PCT Int'l Appl. . |
| WO91/02025 | 2/1991 | PCT Int'l Appl. . |
| 2190093 | 11/1987 | United Kingdom . |
| 8802313 | 3/1988 | United Kingdom . |

OTHER PUBLICATIONS

Polyvinyl Alcohol Properties and Applications, C. A. Finch, 1973, p. 194 and Table 9.8.
Chemical Abstracts, vol. 7, No. 8, p. 47, Abstract No. 60151n, F. H. Otey et al., "Starch-based blown films" (Aug. 24, 1987).
Otey, F. H. et al., Ind. Eng. Chem. Res. 26(8):1659-63 (1987), "Starch-Based Blown Films".

*Primary Examiner*—Paul R. Michl
*Assistant Examiner*—LaVonda DeWitt
*Attorney, Agent, or Firm*—Elizabeth M. Barnhard; Bryan Cave

[57] ABSTRACT

Polymer compositions useful for the production of articles of biodegradable plastics material with improved biodegradability include destructed starch and a polymer selected from the group consisting of ethylene-vinyl alcohol, polyvinyl alcohol and mixtures thereof wherein at least a portion of the said polymer is modified by the substitution of from 0.1 to 5 molar % of the functional alcohol groups in the polymer chain by X groups in which X is an oxo or an alkyl carbonyl group in which the alkyl group contains from 1 to 4 carbon atoms.

18 Claims, No Drawings

POLYMER COMPOSITIONS FOR THE PRODUCTION OF ARTICLES OF BIODEGRADABLE PLASTICS MATERIAL AND METHODS OF THEIR PREPARATION

The invention relates to polymer compositions useful for the production of articles of biodegradable plastics material and to methods for their preparation.

In particular, the invention constitutes an improvement within the scope of the invention described in unpublished Italian Patent Application No. IT 67413-A/89 and the corresponding EP 90110070.1 whose contents should be understood as being incorporated herein by way of reference.

Application No. IT 67415-A/89 and the corresponding EP 90110071.9 which constitutes prior art only for the purpose of A 54(5) EPC, describe polymer compositions including a destructured starch and an ethylene-vinyl alcohol copolymer for the production of articles of biodegradable plastics material. These compositions may include further polymeric additives such as, in particular polyvinyl alcohol and an ethylene-acrylic acid copolymer The particular object of the invention which is the subject of the above mentioned applications is to provide compositions which can be formed into films or into moulded articles with improved mechanical strength. The biodegradability of the composition is ensured, in particular, by the completely biodegradable starch component.

The object of the present invention is to improve the biodegradability of polymer compositions of the type mentioned above.

With regard to this object, the subject of the invention is constituted by a composition including a destructured starch and a synthetic polymer selected from the group consisting of ethylene-vinyl alcohol, polyvinyl alcohol and mixtures thereof, wherein at least a portion of said polymers is modified by the substitution of from 0.1 to 5 molar % of the functional alcohol groups in the polymeric chain by X groups in which X is an oxo (O=) or an alkyl carbonyl group

in which the alkyl group contains from 1 to 4 carbon atoms.

It has been found that, when the aforesaid groups are substituted for the alcohol groups within the limits defined above, the compatibility of the polymers with the starch remains substantially unchanged so that, although the capacity to form films and the mechanical properties of the films and moulded articles produced from the compositions are substantially unchanged, the biodegradability upon exposure to atmospheric agents of the moulded articles and films thus produced is improved, particularly as regards photodegradability.

The amount of modified polymers within the composition may range from 5 to 100% wt, preferably from 10 to 50% wt referred to the total amount of synthetic polymer.

The modified polymers used within the scope of the invention can be produced by known methods from commercially available ethylene-vinyl alcohol polymers and polyvinyl alcohol polymers.

In particular, as regards the oxo groups, the structural modification can be introduced by the reaction of previously-prepared polymers with hydrogen peroxide and persulfuric acid, by the reaction of such polymers with hypochlorite and acetic acid, or by other methods of oxidizing secondary alcohols described in the literatures.

Modified copolymers including alkyl carbonyl groups can be obtained from ethylene vinyl acetate (EVA) polymer systems with a low ethylene content, that is, with an ethylene content of from 10 to 50%, preferably from 20 to 40%, by weight, by free-radical polymerization in the presence of monomers of the

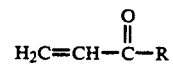

type in which R is an alkyl group with from 1 to 4 carbon atoms, together with ethylene and vinyl alcohol.

The EVAs thus obtained are then converted into modified ethylene-vinyl alcohol copolymers by basic hydrolysis.

Ethylene/vinyl alcohol copolymers usable within the scope of the present invention after structural modification typically have an ethylene content of from 10 to 90% by weight, preferably from 10 to 40% by weight, with a melt index of between 2 and 50, preferably between 6 and 20 (210° C., 2.16 Kg).

Further preferred features for the ethylene/vinyl alcohol copolymer are as follows:

| | | |
|---|---|---|
| Intrinsic viscosity, [η] (in DMSO at 30° C.) | preferably | 0.50–0.90 0.65–0.80 |
| Molecular weight distribution Mw/Mn (GPC in tetrahydrofurane) | | 1.3–4 |
| Melting point temperature | preferably | <180° C. 160–170° C. |
| Hydrolysis degree* | | 90–99.9% |

*Basic hydrolysis and titration of the residual base with acid.

The modified polymers may further be obtained by ozone-treatment of polyvinyl alcohol or of the above mentioned ethylene/vinyl alcohol copolymers.

The methods of preparing compositions of destructured starch and ethylene-vinyl alcohol copolymers by extrusion in a heated extruder are described in the Italian Patent Application No. 67413-A/89 and corresponding European Patent Application 90110070.1 mentioned above. The method of preparing the composition&according to the invention is defined in claims 10-18 hereinafter.

In particular, the modified ethylene-vinyl alcohol polymer can be produced beforehand by the reactions described above and supplied to the extruder together with the other components described therein, such as high-boiling plasticizers, and destructuring agent such as an alkali metal or alkaline earth metal hydroxide, and perhaps water, or, alternatively, the structural modification of the copolymer may be carried out during the extrusion process by the addition of the aforementioned reagents before the stage at which the components are mixed.

As regards the use of polyvinyl alcohol, compositions including starch and polyvinyl alcohol are described, for example, in U.S. Pat. No. 3,949,145 and the polyvinyl alcohol polymer modified in accordance with the invention can be used for the production of the films described therein.

In those compositions according to the invention which include starch and modified and non modified ethylene-vinyl alcohol copolymer, the starch and the copolymer are used in a weight ratio of from 1:19 to 19:1 and preferably in a weight ratio of from 1:4 to 4:1.

The invention further includes films, sheets, fibers and moulded articles made from the herein described polymer compositions.

EXAMPLE

An ethylene/vinyl alcohol copolymer, Clarene R20 (registered trade mark), was modified by reaction with hydrogen peroxide and persulfuric acid to form a modified copolymer in which 3 molar % of the alcohol groups in the original polymer were substituted by carbonyl groups. The method described in Example 1 of Italian Patent Application No. IT 67413-A/89 which is reported hereinafter, was repeated with the modified copolymer prepared beforehand being substituted for the Clarene R20 copolymer used therein. The mechanical strength tests to which the test pieces of the film thus obtained were subjected gave extension, yielding and breaking stress, and Young's modulus values substantially equal to those obtained in the Example 1 mentioned above.

By virtue of the introduction of the carbonyl groups, however, the films thus produced had improved characteristics of photodegradability.

EXAMPLE 1 OF IT 67413-A/89 AND CORRESPONDING EP 90110070.1

An ethylene/vinyl alcohol copolymer, Clarene R20 (registered trademark), and 15% of glycerine by weight of the copolymer were extruded at 140° C. by HAAKE Reomex extruder, model 252, with an L/D ratio of 19, a screw diameter of 19 mm, and a compression ratio of 1:3, and with the screw revolving at 40 rpm.

50 parts of the product thus obtained were mixed with 70 parts of GLOBE 03401 CERESTAR (registered trademark) starch, 50 parts of water and 15 parts of urea, and then extruded by the same extruder at 120° C. The extrusion thus obtained was converted into pellets.

The pellets were supplied to the same extruder with the use of a film-blowing head. Rectangular test pieces for tensile testing according to ASTM 882 were formed from the films approximately 100 microns thick.

The test pieces were conditioned at 23±1° C. and 55±5% relative humidity for 24 hours.

The mechanical strength tests gave the following results expressed as average values:

| | |
|---|---|
| Young's modulus | 5285 kg/cm² |
| yielding strain | 17% |
| yielding stress | 186 kg/cm² |
| breaking strain | 52.8% |
| breaking stress | 178 kg/cm² |

We claim:

1. A polymer composition useful for the production of articles of biodegradable plastics material, including a destructured starch and a synthetic polymer selected from the group consisting of ethylene-vinyl alcohol, and polyvinyl alcohol and mixtures thereof, wherein at least a portion of said polymers is modified by the substitution of from 0.1 to 5 molar % of the functional alcohol groups in the polymer chain by X groups in which X is an oxo group or an alkyl carbonyl group in which the alkyl group contains from 1 to 4 carbon atoms.

2. A composition according to claim 1, in which the modified polymer is produced by the reaction of the corresponding polymer with hydrogen peroxide and persulfuric acid.

3. A composition according to claim 1, in which the modified polymer is produced by the reaction of the corresponding polymer with hypochlorite and acetic acid.

4. A composition according to claim 1, including an ethylene-vinyl alcohol copolymer with an ethylene content of from 10 to 40% by weight.

5. A composition according to claim 1, in which the modified polymer is produced by the synthesis of ethylene-vinyl acetate with an ethylene content of from 10 to 50% by weight in the presence of monomers of the

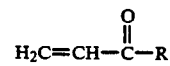

type in which R is a $C_1$-$C_4$ alkyl group, and subsequent basic hydrolysis.

6. A composition according to claim 1, wherein the modified polymer is obtained by ozonolysis of polyvinyl alcohol or ethylene-vinyl alcohol copolymers having an ethylene content of from 10 to 40% wt.

7. A composition according to claim 1, wherein the modified polymer amounts to 10-50% wt of the synthetic polymer in the composition.

8. Articles in the form of films made from a polymer composition according to claim 1.

9. Moulded articles made from a polymer composition according to claim 1.

10. A method for the preparation of a polymer composition usable for the production of articles of biodegradable plastics material, comprising the step of:

mixing starch and a synthetic polymer selected from the group consisting of ethylene-vinyl alcohol, polyvinyl alcohol and mixtures thereof, wherein at least a portion of said polymers is modified by the substitution of from 0.1 to 5 molar % of the functional alcohol groups in the polymer chain by X groups in which X is an oxo group or an alkyl carbonyl group in which the alkyl group contains from 1 to 4 carbon atoms, wherein the weight ratio between the starch and total amount of synthetic polymer is of from 19:1 to 1:19, with a quantity of a high-boiling plasticizer of from 0.05 to 100% of the weight of the starch, optional in the presence of a destructuring agent selected from the group consisting of urea, alkaline-earth and alkali metal hydroxides, in an extruder which is heated to a temperature and for a period of time sufficient to bring about the destructuring of the starch.

11. A method according to claim 10, wherein the modified polymer is an ethylene/vinyl alcohol copolymer and said copolymer is mixed within the extruder heated to a temperature between 120° and 170° C. with a destructured-starch-based component which is prepared beforehand by mixing starch in an extruder with a quantity of a high-boiling plasticizer of from 0.05 to 100% of the weight of the starch, in the presence of a quantity of a destructuring agent selected from the group consisting of urea, alkaline or alkaline-earth hydroxides, and mixtures thereof effective for causing the destructuring of the starch at a temperature below the boiling of the plasticizer and between 120° and 170° C.

12. A method according to claim 10, in which the high-boiling plasticizer is selected from the group consisting of glycerine, polyethylene glycol, ethylene glycol, propylene glycol, sorbitol, and mixtures thereof.

13. A method according to claim 10, in which the destructuring agent is added in a quantity of from 2 to 20% of the weight of the starch component, in which the mixing operation is carried out with the addition of a quantity of water of from 0.05 to 100% of the weight of the starch component, and in which the water concentration is reduced to a value no greater than 6% of the weight of the whole composition.

14. A method according to claim 11, also including the addition of ammonia.

15. A method according to claim 10, in which the modified polymer is produced by the reaction of the corresponding polymer with hydrogen peroxide and persulfuric acid.

16. A method according to claim 10, in which the modified polymer is produced by the reaction of the corresponding polymer with hypocholorite and acetic acid.

17. A method according to claim 11, wherein the ethylene-vinyl alcohol copolymer has an ethylene content of from 10 to 40% by weight.

18. A method according to claim 11, in which the modified polymer is produced by the synthesis of ethylene-vinyl acetate with an ethylene content of from 10 to 50% by weight in the presence of monomers of the

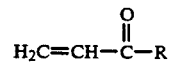

type in which R is a $C_1$–$C_4$ alkyl group, and subsequent basic hydrolysis.

* * * * *